(12) United States Patent
Qin et al.

(10) Patent No.: US 9,359,755 B2
(45) Date of Patent: Jun. 7, 2016

(54) WATER PURIFICATION AND STORAGE SYSTEM, WATER-FILTERING WELL AND POLYGONAL BUILDING BLOCK

(71) Applicant: Beijing Rechsand Science & Technology Group Co., Ltd., Beijing (CN)

(72) Inventors: Shengyi Qin, Beijing (CN); Shengyuan Qin, Beijing (CN); Zhenbang Wang, Beijing (CN); Meijuan Chen, Beijing (CN); Mingyue Dou, Beijing (CN)

(73) Assignee: Beijing Rechsand Science & Technology Group Co., Ltd., Beijing (CN)

( * ) Notice: Subject to any disclaimer, the term of this patent is extended or adjusted under 35 U.S.C. 154(b) by 16 days.

(21) Appl. No.: 14/396,970

(22) PCT Filed: Apr. 26, 2013

(86) PCT No.: PCT/CN2013/074821
§ 371 (c)(1),
(2) Date: Oct. 24, 2014

(87) PCT Pub. No.: WO2013/159737
PCT Pub. Date: Oct. 31, 2013

(65) Prior Publication Data
US 2015/0108053 A1    Apr. 23, 2015

(30) Foreign Application Priority Data

| Apr. 26, 2012 | (CN) | 2012 1 0125550 |
| Apr. 26, 2012 | (CN) | 2012 1 0125562 |
| Apr. 26, 2012 | (CN) | 2012 2 0182270 |
| Apr. 26, 2012 | (CN) | 2012 2 0182283 |
| Apr. 26, 2012 | (CN) | 2012 2 0182361 |
| May 24, 2012 | (CN) | 2012 2 0236231 |

(51) Int. Cl.
*E03F 5/10* (2006.01)
*E03F 5/14* (2006.01)
(Continued)

(52) U.S. Cl.
CPC .. *E03F 5/14* (2013.01); *C02F 1/004* (2013.01); *C02F 1/28* (2013.01); *E03B 3/20* (2013.01); *E03F 1/002* (2013.01); *E03F 5/10* (2013.01); *C02F 2103/001* (2013.01); *C02F 2201/002* (2013.01)

(58) Field of Classification Search
CPC ...................................... E03F 5/10; E03F 5/14
See application file for complete search history.

(56) References Cited

U.S. PATENT DOCUMENTS

| 6,120,210 A * | 9/2000 | Hsu ................................. 405/50 |
| 2009/0049760 A1* | 2/2009 | Stuck .............................. 52/79.1 |

FOREIGN PATENT DOCUMENTS

| CN | 2633963 Y | 8/2004 |
| CN | 201512826 U | 6/2010 |

(Continued)

*Primary Examiner* — Tara M. Pinnock
(74) *Attorney, Agent, or Firm* — Mendelsohn Dunleavy, P.C.

(57) ABSTRACT

A water purification and storage system comprises a water storage container, a covering plate and an impermeable wall. The water storage container is formed by a plurality of tangentially connected polygonal water-filtering wells (1). Well walls of the water-filtering wells (1) are of a water-permeable structure, and an impermeable layer (4) is arranged at the bottom of the well, wherein at least one of the water-filtering wells (1) is a water output well (14). The covering plate (2) is arranged at the upper portion of the water storage container, and comprises an impermeable covering plate (21) arranged at the upper portion of the water output well (14) and a water-permeable covering plates (22) arranged at the upper portions of the remaining water-filtering wells. The impermeable wall (3) is arranged around the water storage container. The water purification and storage system is suitable for the collection and purification of rain water. Also disclosed are a water-filtering well (1) for use in the water purification and storage system, and a polygonal building block (12) for building around the water-filtering well (1).

19 Claims, 4 Drawing Sheets

(51) Int. Cl.
*C02F 1/00* (2006.01)
*C02F 1/28* (2006.01)
*E03F 1/00* (2006.01)
*E03B 3/20* (2006.01)
*C02F 103/00* (2006.01)

(56) References Cited

FOREIGN PATENT DOCUMENTS

| | | |
|---|---|---|
| CN | 101839009 A | 9/2010 |
| CN | 101891313 A | 11/2010 |
| CN | 202157372 U | 3/2011 |
| CN | 201991263 U | 9/2011 |
| CN | 202046934 U | 11/2011 |
| CN | 202157376 U | 3/2012 |
| CN | 202157407 U | 3/2012 |
| CN | 202730849 U | 2/2013 |
| CN | 202730850 U | 2/2013 |
| CN | 103174194 A | 6/2013 |
| CN | 103174195 A | 6/2013 |
| JP | 2005179931 A | 7/2005 |
| JP | 2008253977 A | 10/2008 |
| KR | 100837392 B1 | 6/2008 |

* cited by examiner

WATER PURIFICATION AND STORAGE SYSTEM, WATER-FILTERING WELL AND POLYGONAL BUILDING BLOCK

TECHNICAL FIELD

The present invention relates to the field of water treatment, in particular to a water purification and storage system and a water-filtering wells for purifying water as well as a polygonal building block constituting the water-filtering well.

BACKGROUND

Existing water purification and storage systems generally include a tank located underground for storing sewage and a specific water purification system exterior of the tank for sewage purification treatment. Such water purification and storage systems are of high cost and large investment. In addition, the bottom and the four walls of the above-mentioned tanks generally employ impermeable concrete for impermeable treatment, but cracks are likely to occur on the walls, which leads to the water leakage.

To address the above mentioned issue, Chinese patent literature CN101839009A provides a multi-wells water storage system including a water storage container opened from the upper part, the wall of which is a water-proof structure; a water-collecting well within the water-storage container, wherein the water-collecting well is provided with a water-proof well cover and the wall of the well has a water-permeable structure. The filler is filled between the water-collecting well and the water-storage container. The water-permeable surface layer is applied on the filler which includes fine sand and water-permeable water-storing carrier having water-storing space. There are multiple water-collecting wells which are connected with each other via connection tubes. This system collects rainwater or sewage which is then purified by the filtration of permeable surface layer and the sediment of the fine sand. In addition, the water stored in the filler or within the water-collecting well is not easy to be deteriorated and stinking. But such water storage system has the following defects. Firstly, since the filler includes the mixed fine sand and multiple water-permeable water-storing carriers, the anti-pressure ability is poor and the tank is easy to collapse. Besides, the water collecting well thereof is a circular water-filtering well and is hard to construct despite its ability to disperse the forces around the body of the well. If it is built by using small bricks, the overall stability will be decreased and there is still a possibility of collapse. Secondly, the effective water storage rate is lower due to the presence of the filler. Thirdly, the structure breathability of the bottom and walls of the tank is poor. If there is no circulation in the system for a long time, the water body in the tank will deteriorate and hinder the normal use.

To address the building issues of existing architecture and municipal corollary facility structures (water storage tank, inspection well etc.), Chinese patent literature CN2633963Y discloses a specific brick for the water well. The horizontal cross section is an isosceles trapezoid. The inner surface of the brick body where the upper edge of the trapezoid that is located is one edge of a pentagon or equilateral polygon having more than five edges. The two base angles of the isosceles trapezoid have rounded corners. As such, after the combination of building blocks, the angels are opposing to each other forming a complete cylindrical shape with strong resistance to external pressure. But such building blocks cause a problem that when two adjacent layers of building blocks are vertically connected to each other, the misalignment of seam cannot be guaranteed, which makes structure of the well body still unstable.

SUMMARY

To this end, the present invention aims to solve the current technical problem that the existing tank is easy to collapse and the water storage rate is low. Further, the present invention provides a water purification and storage system that the tank body thereof is strong and the water storage rate is high.

The second technical problem to be addressed is the poor stability of the present architecture and municipal corollary facility structures built by using the existing building blocks with regular shapes. Therefore, the present invention provides a polygonal building block and water-filtering wells that is simple in structure, easy for construction and of high stability after the building block is bonded.

To address the first technical problem described above, the present invention discloses a water purification and storage system, it comprises: a water storage container formed by a plurality of tangentially connected polygonal water-filtering wells; the number of the edges of the polygon is within the range of 5-10; the well wall of the water-filtering well has a water-permeable structure, and an anti-leakage layer is arranged at the bottom of the well, wherein at least one of the water-filtering wells is a water output well; a covering plate arranged at the upper portion of the water storage container comprises an impermeable covering plate arranged at the upper portion of the water output well and a water-permeable covering plates arranged at the upper portions of the remaining water-filtering wells; and an diaphragm wall arranged around the water storage container.

In the above water purification and storage system, the well wall of the water-filtering well is built by multilayer of hexagonal subunits and the subunits are spliced by six building blocks.

Preferably, a cavity is arranged between the outer wall and the inner wall of the building block, and within the cavity the water purifying material is provided.

Preferably, the sub-unit is orthohexagonal and is spliced by six building blocks and the seams of the building blocks of adjacent layers are misaligned.

Preferably, the building block is a brick of isosceles trapezoid with the base angle of 60 degrees, the side wall of the former building block is in turn adhesively connected to the long edge of the next building block; the long edge of the building block finally encloses and forms the inner wall of the water-filtering well, and the short edge of the building block together with the side wall finally encloses and forms the outer wall of the water-filtering well.

Further preferably, an inner catching groove is provided at one side of the long edge of the building block and adaptive for the insertion of the side wall of the adjacent building blocks, the side wall of the former building block is in turn adhesively connected to the inner catching groove of the next building block, and the long edge of the building block finally encloses and forms the inner wall of the water-filtering well, and the short edge of the building block together with the side wall finally encloses and forms the outer wall of the water-filtering well.

In the above water purification and storage system, the building block includes permeable surface layer and permeable substrate; the permeable surface layer and the permeable substrate are tightly integrated together, wherein the permeable surface layer forms the inner well wall of the water-filtering well and the permeable substrate forms the outer well wall of the water-filtering well; particles of aggregates and the adhesives wrapping the particles of aggregates are respectively included in the permeable surface layer and the permeable substrate; the adhesives in the permeable surface layer at least include hydrophilic adhesive; the grain diameter of the particles of aggregates of the permeable surface layer is 0.2-0.425 mm and the grain diameter of the particles of aggregates of the permeable substrate is 1-10 mm.

In the above water purification and storage system, the water-permeable covering plate is formed by applying multiple hexagonal water-permeable covering plates including particles of aggregates and hydrophilic adhesive wrapping the particles of aggregates; the grain diameter of the particles of aggregates is 0.2-0.425 mm.

In the above water purification and storage system, the impermeable covering plate includes particles of silica sand and hydrophobic adhesives wrapping the particles of silica sand; air voids that gas molecule can pass through but the liquid water molecules cannot penetrate are formed between the adjacent particles of silica sand; the grain diameter of the silica sand is 0.2-0.425 mm.

In the above water purification and storage system, the diaphragm wall is formed by a layer of breathable impermeable grit with a thickness of 5 cm-10 cm sandwiched by two layers of nonwovens; the breathable impermeable grit comprises particles of aggregates and hydrophobic resin membrane wrapping particles of aggregates; the grain diameter of the particles of aggregate is 0.075-0.425 mm.

In the above water purification and storage system, from bottom to top, the anti-leakage layer includes in turn a bearing layer applied by the permeable concrete and a breathable layer applied by breathable impermeable grit including particles of aggregates and the hydrophobic resin membrane wrapping particles of aggregates; the grain diameter of the particles of aggregates is 0.075-0.425 mm.

In the above water purification and storage system, at least one of the water-filtering wells in the water storage container is a water input well connected with the sewage to be treated; the water input well is separated from the water output well by a distance of at least one water-filtering well; and the water output well is connected with a water suction pump.

To address the above-mentioned second technical problem, the present invention provides a water-filtering well comprising a well wall having water-permeable structure; the well wall is built by the polygonal subunits; the number of the edges of the polygon is within the range of 5-10; the subunits are spliced by building blocks and the number of the building blocks of the subunit is same as the number of the edges of the subunit.

In the above-mentioned water-filtering well, the subunit is a regular hexagon and is spliced by six building blocks of the same size and the seams of the building block of adjacent layers are misaligned.

In the above-mentioned water-filtering well, a cavity is arranged between the outer wall and the inner wall of the well wall, within which the water purifying material is provided.

In the above-mentioned water-filtering well, the building block is a brick of isosceles trapezoid with the base angle of 60 degrees, the side wall of the former building block is in turn adhesively connected to the long edge of the next building block; the long edge of the building block finally encloses and forms the inner wall of the water-filtering well, and the short edge of the building block together with the side wall finally encloses and forms the outer wall of the water-filtering well.

In the above-mentioned water-filtering well, the building block is a brick of isosceles trapezoid with the base angle of 60 degrees, an inner catching groove is provided at one side of the long edge of the building block and adaptive for the insertion of the side wall of the adjacent building blocks, the side wall of the former building block is in turn adhesively connected to the inner catching groove of the next building block, and the long edge of the building block finally encloses and forms the inner wall of the water-filtering well, and the short edge of the building block together with the side wall finally encloses and forms the outer wall of the water-filtering well.

In the above-mentioned water-filtering well, the building block includes permeable surface layer and permeable substrate; the permeable surface layer and the permeable substrate are tightly integrated together, wherein the permeable surface layer forms the inner wall of the water-filtering well and the permeable substrate forms the outer wall of the water-filtering well; particles of aggregates and the adhesives wrapping the particles of aggregates are respectively included in the permeable surface layer and the permeable substrate; the adhesives in the permeable surface layer at least include hydrophilic adhesive; the grain diameter of the particles of aggregates of the permeable surface layer is 0.2-0.45 mm and the grain diameter of the particles of aggregates of the permeable substrate is 1-10 mm.

In the above-mentioned water-filtering well, the building block includes two layers of permeable surface layer and permeable substrate; the permeable surface layer and the permeable substrate are tightly integrated together, wherein the two layers of permeable surface layer forms the inner wall and outer wall of the water-filtering well and the permeable substrate is located between the permeable surface layers; particles of aggregates and the adhesives wrapping the particles of aggregates are respectively included in the permeable surface layer and the permeable substrate; the adhesives in the permeable surface layer at least include hydrophilic adhesive; the grain diameter of the particles of aggregates of the permeable surface layer is 0.2-0.45 mm and the grain diameter of the particles of aggregates of the permeable substrate is 1-10 mm.

In the above-mentioned water-filtering well, the building block comprises particles of aggregates and hydrophilic adhesive wrapping the particles of aggregates; the grain diameter of the particles of aggregates is 0.2-0.45 mm.

Meanwhile, the present invention also discloses a polygonal building block which can be used for building municipal corollary facility structures (water storage tank, inspection well etc.). The horizontal cross section of the building block is isosceles trapezoid with inner catching groove provided on the long edge, the inner catching groove is adaptive for the insertion of the side wall of the abutting building blocks, the side wall of the former building block is in turn adhesively connected to the inner catching groove of the next building block, and the long edge of the building block finally encloses and forms the inner wall of the structure, and the short edge of the building block together with the side wall on the other side finally encloses and forms the outer wall of the structure.

The horizontal cross section of the building block is isosceles trapezoid with the base angle of 60 degrees, the adjacent side surfaces of the building block are transited by rounded corners.

Six of the building blocks build the regular hexagon subunit; multiple layers of the subunits build the structure; the seams of the building blocks of the adjacent layers are misaligned.

The building block includes a permeable surface layer and a permeable substrate; the permeable surface layer and the permeable substrate are tightly integrated together, wherein the permeable surface layer forms the inner wall of the structure and the permeable substrate forms the outer wall of the structure; particles of aggregates and hydrophilic adhesives wrapping the particles of aggregates are respectively included in the permeable surface layer and the permeable substrate; the grain diameter of the particles of aggregates of the permeable surface layer is 0.2-0.45 mm and the grain diameter of the particles of aggregates of the permeable substrate is 1-10 mm.

The building block includes two permeable surface layers and a permeable substrate; the permeable surface layer and the permeable substrate are tightly integrated together, wherein the two permeable surface layers form the inner wall and outer wall of the structure and the permeable substrate is located between the permeable surface layers; particles of aggregates and hydrophilic adhesives wrapping the particles of aggregates are respectively included in the permeable surface layer and the permeable substrate; the adhesives in the permeable surface layer at least comprises hydrophilic adhesive; the grain diameter of the particles of aggregates of the permeable surface layer is 0.2-0.45 mm and the grain diameter of the particles of aggregates of the permeable substrate is 1-10 mm.

The building block comprises particles of aggregates and hydrophilic adhesives wrapping the particles of aggregates and the grain diameter of the particles of aggregates is 0.2-0.45 mm.

Compared with the prior art, the aforementioned technical solutions of the present application have the following advantages.

(1) In the water purification and storage system of the present application, the water storage container is designed as a connection form of tangentially connected polygon. Compared with the prior art, the overall body of the tank is stable and will not collapse. In addition, all well walls of the water-filtering wells may function to filter and purify the water, the water storage rate is greatly enhanced in the premise that the quality of water output is fully up to the standard.

(2) Further, the water purification and storage system simulates the honeycomb structure such that the water storage container is arranged by the tangential connection of multiple hexagonal water-filtering wells. The hexagonal subunit is spliced by six building blocks of the same size. Since regular hexagon has the characteristics of circle, it may disperse the surrounding force. In the premise that the water storage container of such structure is ensured to be firm and stable, it also has the advantages of honeycomb structure, e.g. material saving, high capacity, increased water storage rate. Meanwhile, the seams of the building blocks between the adjacent layers of the water-filtering well are misaligned, that is, the seams of the two layers vertically adjacent to each other in the water-filtering well are misaligned, thus further enhances the stability of the structure of the water-filtering well.

(3) Further, a cavity is provided inside the building block of the water-filtering well and water purification material is filled in the cavity. After a long time, a biomembrane will be adhered to the surface of the water purification material. The purification of rainwater is further intensified by the biological purification of the biomembrane. The entrance of rainwater into the water output well through multiple well walls of the water-filtering wells is able to ensure the water output fully meets the water quality standard of the source of drinking water.

(4) The building block is preferably provided with inner catching groove and is connected by the inner catching groove at the interface of the bricks. The side wall of the former building block (building block) is in turn adhesively connected to the inner catching groove of the next building block (building block). The building blocks engage with each other and the built architecture becomes a forced integral. The problem of inward offset of the building block due to the surrounding forces can be solved. Therefore, the mechanical property of the water-filtering well is better. It can not only permeate the water effectively but also avoid the collapse. In addition, the adjacent side surfaces of the building blocks (building block) are transited by rounded corners thus it may achieve an easy demoulding and improve the yield and quality.

(5) The building block of the present application is formed by the adhesion of particles of aggregates with the particle size of 0.2-0.45 mm and hydrophilic adhesive. Because the permeable aperture of the building block is far smaller than the particles in the water, the particles are kept outside, which hence further purifies the water seepage body without blocking the seepage well. Because the particles of aggregates are adhered by hydrophilic adhesive, the water-filtering well can seepage water effectively. In order to save cost, the building blocks can be formed by the adhesion of a layer of permeable substrate of particles of aggregates with a particle size of 1-10 mm and two permeable surface layers of particles of aggregates with a particle size of 0.2-0.45 mm or by the adhesion of a permeable substrate sandwiched by permeable surface layers.

(6) The diaphragm wall can be formed by a layer of breathable impermeable grit with a thickness of 5-10 cm sandwiched by two layers of nonwovens. In addition, the breathable impermeable grits are applied on the bottom of the water-filtering wells. Therefore, it can avoid seepage and connect the ground. The ion exchange between the soil and water body can be connected through making sure the water in the tank will not deteriorate.

BRIEF DESCRIPTION OF THE DRAWINGS

To make the present invention more easily understood, detailed description of the present application is further given below in accordance with the embodiments taken in conjunction with the accompanying drawings, in which.

LIST OF REFERENCE NUMBERS

1—water-filtering well;
2—covering plate;
3—water-proof wall;
4—impermeable layer;
5—water-permeable substrate;
6—water-permeable surface layer;
11—subunit;
12—building block; building block;
13—cavity;

14—water output well;
15—water input well;
122—long edge;
121—inner catching groove;
123—side wall;
124—short edge;
21—impermeable covering plate;
22—water-permeable covering plate;
41—bearing layer;
42—breathable layer.

DETAILED DESCRIPTION OF THE PREFERRED EMBODIMENTS

Embodiment 1

Figure 1:
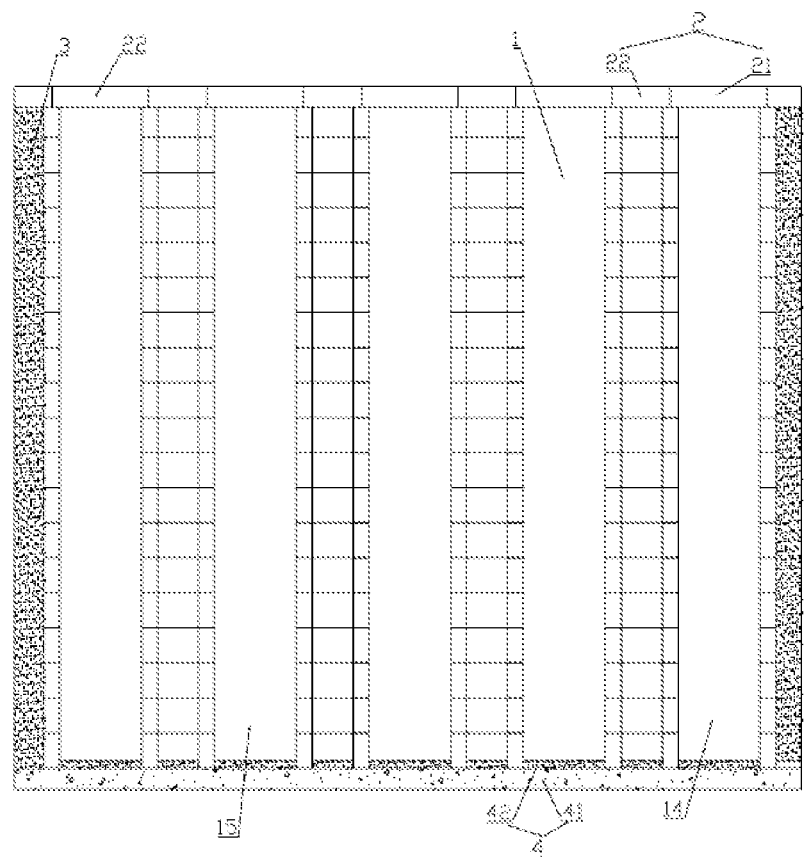
FIG. 1 is a structural schematic view of the water purification and storage system according to the present application.
Figure 2:
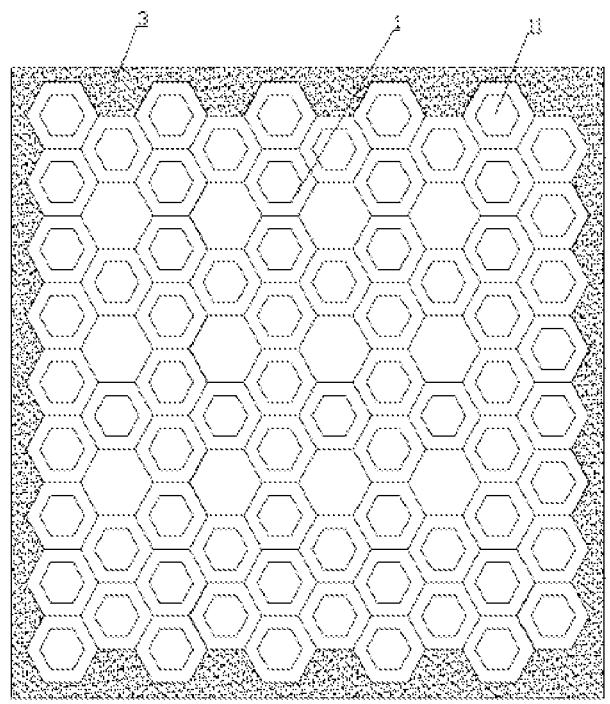
FIG. 2 is a top view of the water purification and storage system according to the present application.

FIG. 1 and FIG. 2 are a water purification and storage system comprising water storage container, a covering plate 2 provided in the upper portion of the water storage container and a diaphragm wall 3 disposed around the water storage container.

Wherein, the water storage container is composed by a plurality of tangentially connected polygonal water-filtering wells 1. Well walls of the water-filtering wells 1 have a water-permeable structure, and an anti-leakage layer 4 is arranged at the bottom of the well, wherein at least one of the water-filtering wells 1 is a water output well 14. In this embodiment, the number of the water output well 14 is one and the water output well 14 is connected with a water suction pump.

From bottom to top, the anti-leakage layer 4 includes in turn a bearing layer 41 applied by the permeable concrete and a breathable layer 42 applied by breathable impermeable grit including particles of aggregates and the hydrophobic resin membrane wrapping particles of aggregates, wherein the grain diameter of the particles of aggregates is 0.075-0.15 mm. As such, the bottom of the water-filtering well realizes the breathability and the water proof.

Figure 3:
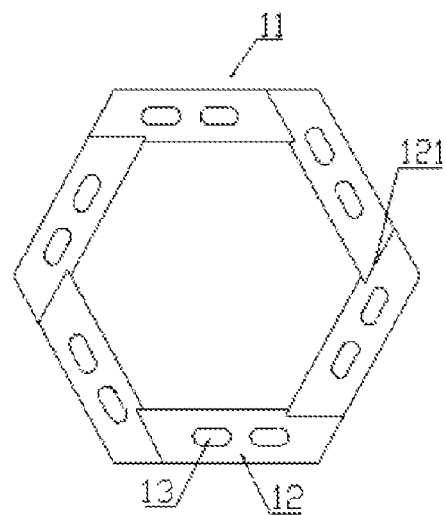
FIG. 3 is a structural schematic view of a hexagonal subunit.

In the present embodiment, the well wall of the water-filtering well 1 is built by multilayers of orthohexagonal subunits 11. As shown in FIG. 3, the subunits 11 are spliced by six building blocks 12 of the same size. The water-filtering wells 1 are tangentially connected to each other. The tangential connection includes a connection sharing one well wall between the two water-filtering wells 1 and an interconnection of the well walls of the two water-filtering wells 1.

A cavity 13 is arranged between the outer wall and the inner wall of the building block 12, within which the water purification material is provided. The water purification material in the present embodiment is the water purifying and filtering grit. A biomembrane will be adhered to the surface of the water purifying material after a long time use of the material. By the purification of the biomembrane, the rainwater purification is further intensified. The entrance of rainwater into the water output well through multiple well walls of the water-filtering wells is able to ensure that the water output will meet the water quality standard of the source of drinking water. Below is the test result of the water quality after treatment by the water purification and storage system of the present application.

Experimental conditions: Total volume of the water storage container of the water purification and storage system is 200 cubic meters. The water input is the rainwater from the road surface in Beijing.

The number of the water-filtering well: The height of the water-filtering well: 2.5 m net in depth; The size of the water-filtering well: inner diameter of 700 mm, outer diameter of 900 mm.

TABLE 1

| Result of PONY Test | | | | | | |
|---|---|---|---|---|---|---|
| Test items | PH | chroma | turbidity | Odor and Taste | suspended solids | chemical oxygen demand CODCr |
| quality of water input | 6.8 | 10 | 36 | null | 48 | 69 |
| quality of water output | 6.7 | <5 | 0.69 NTU | null | <5 mg/L | <10 mg/L |

As can be seen from the result in table 1, after the treatment by the water purification and storage system, the quality of water output meets the requirement of National Standards for Drinking Water Hygienic Standard of People's Republic of China.

Figure 4:
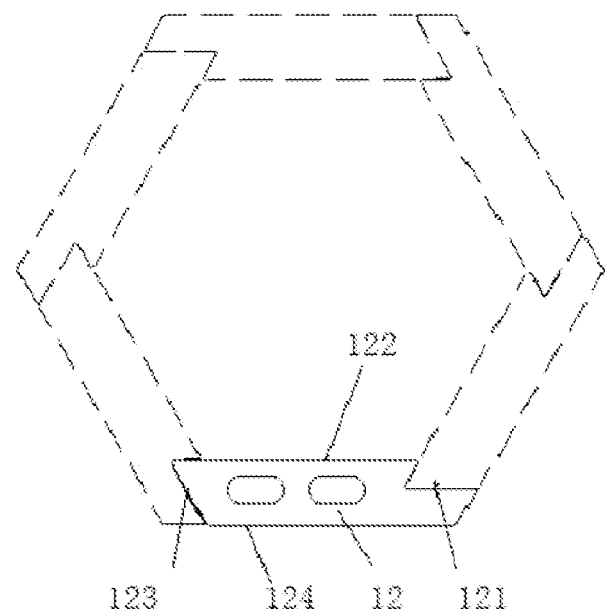
FIG. 4 is a structural schematic view of a polygonal building block.

The polygonal building block disclosed by the present application in this embodiment is equivalent to the building block 12 constituting the subunit 11, as shown in FIG. 4, wherein, the horizontal cross sectional view of the building block 12 is the isosceles trapezoid with an inner catching groove 121 provided on the long edge 121, the base angle thereof is 60 degrees. The abutting the inner catching groove 121 is adapted for the insertion of the abutting side wall 123 of the building block 12. The side wall 123 of the former building block 12 is in turn adhesively connected to the inner catching groove 121 of the next building block 12. The long edge 121 of the building block 12 finally encloses and forms the inner wall of the structure, and the short edge 124 of the building block 12 together with the side wall 123 on the other side finally encloses and forms the outer wall of the structure.

The adjacent side walls of the building block 12 are transited by rounded corners.

Figure 5:
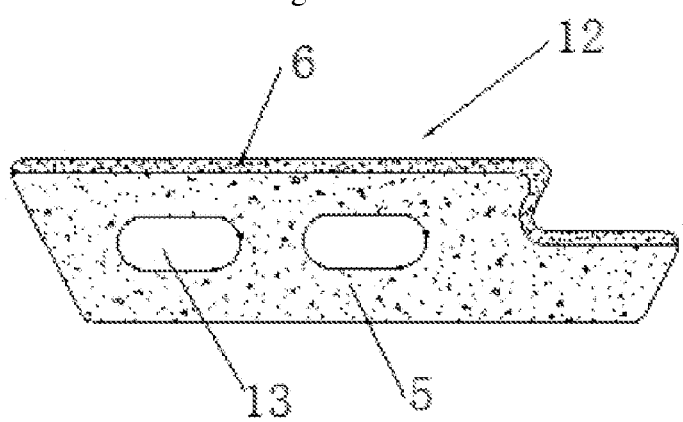
FIG. 5 is a structural schematic view of the polygonal building block having water-permeable surface layer and water-permeable substrate.
Figure 6:
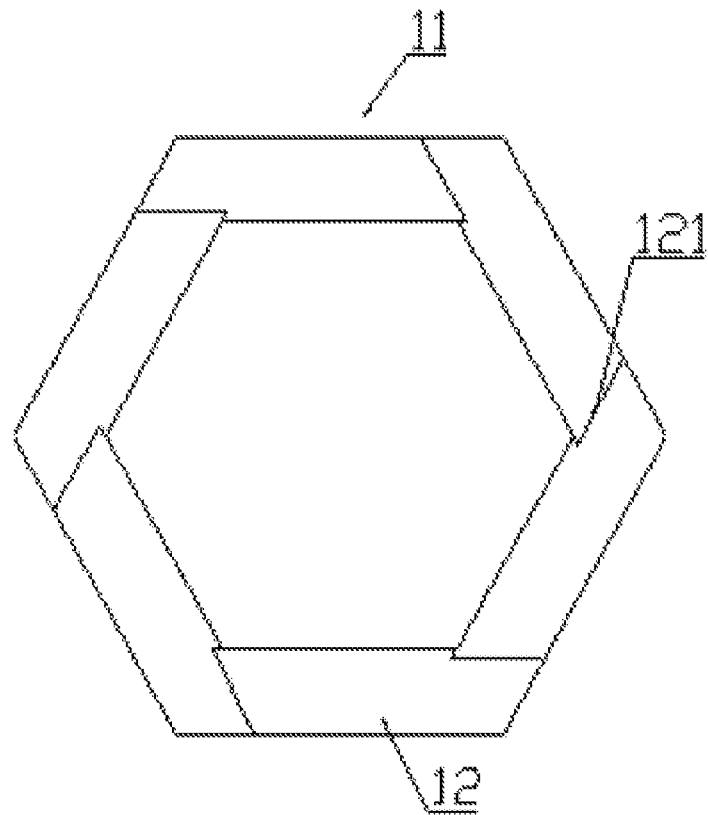
FIG. 6 is a structural schematic view of the hexagonal subunit without cavity.
Figure 7:
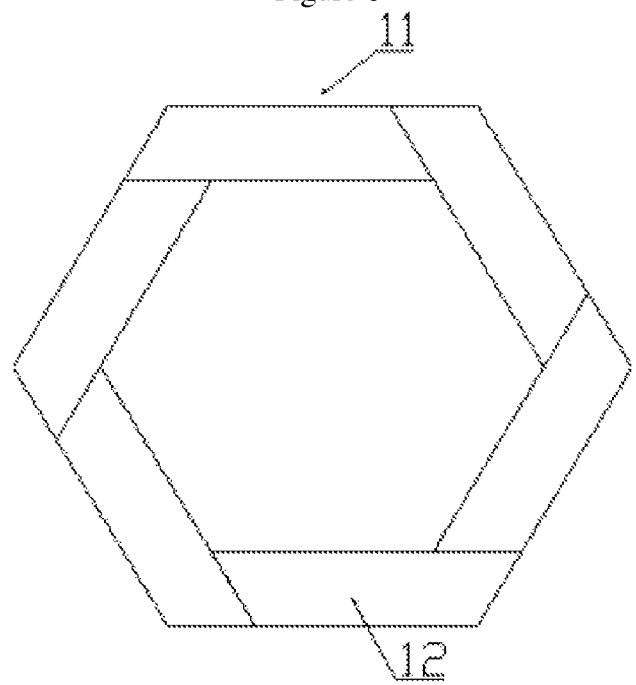
FIG. 7 is a structural schematic view of the hexagonal subunit without inner catching groove.

As shown in FIG. 5, the building block 12 includes permeable surface layer and permeable substrate. The permeable surface layer and the permeable substrate are tightly integrated together, wherein the permeable surface layer forms the inner well wall of the water-filtering well 1 and the permeable substrate forms the outer well wall of the water-filtering well 1. Particles of aggregates and the adhesives wrapping the particles of aggregates are respectively included in the permeable surface layer and the permeable substrate. The adhesives in the permeable surface layer at least include hydrophilic adhesive. The grain diameter of the particles of aggregates of the permeable surface layer is 0.2-0.425 mm and the grain diameter of the particles of aggregates of the permeable substrate is 1-10 mm.

The water-filtering well 1 in the water storage container of the present embodiment includes a water input well 15 connected with the sewage to be treated. The water input well 15 is separated from the water output well 14 by a distance of at least one water-filtering well.

The covering plate 2 of the water purification and storage system includes impermeable covering plates arranged at the upper portion of the water output well 14 and water-permeable covering plates 22 arranged at the upper portions of other water-filtering wells.

The water-permeable covering plate 22 is formed by applying multiple hexagonal water-permeable covering plates including particles of aggregates and hydrophilic adhesive wrapping the particles of aggregates. The grain diameter of the particles of aggregates is 0.2-0.425 mm.

The impermeable covering plate 21 includes particles of silica sand and hydrophobic adhesives wrapping the particles of silica sand. Air voids that gas molecule can pass through but the liquid water molecules cannot penetrate are formed between the adjacent particles of silica sand. The grain diameter of the silica sand is 0.2-0.425 mm.

The diaphragm wall 3 of the water purification and storage system is formed by a layer of breathable impermeable grit with a thickness of 5 cm-10 cm sandwiched by two layers of nonwovens. The breathable impermeable grit includes particles of aggregates and hydrophobic resin membrane wrapping particles of aggregates. The grain diameter of the particles of aggregate is 0.09-0.3 mm.

As water purifying material is provided in the cavity of the building block of each of the water storage well in the present embodiment, the effect of the water purification in the present embodiment is the best. In the cases that high purification is not required, some building blocks without cavities can be provided. The structure of the building block is shown in FIG. 4.

For those skilled in this art, the subunit 11 constituting the water-filtering well 1 may be general hexagon rather than regular hexagon and the building blocks 12 splicing the subunit 11 may be of various sizes.

Embodiment 2

The water purification and storage system in the present embodiment is substantially same with that in the embodiment 1. The distinctions are listed as follows.

As shown in FIG. 5, the building block 12 in the present embodiment is a brick of isosceles trapezoid with the base angle of 60 degrees. The side wall of the former building block 12 is in turn adhesively connected to the long edge of the next building block. The long edge of the building block 12 finally encloses and forms the inner wall of the water-filtering well 1, and the short edge of the building block 12 together with the side wall finally encloses and forms the outer wall of the water-filtering well 1. The processing cost of such building block 12 is lower and suitable for the occasions that the required intensity is low and the water-filtering well is lower.

The building block 12 in the present embodiment includes particles of aggregates and hydrophilic adhesive wrapping the particles of aggregates. The grain diameter of the particles of aggregates is 0.2-0.45 mm.

The diaphragm wall 3 in the present embodiment is formed by a layer of breathable impermeable grit with a thickness of 7.5 cm sandwiched by two layers of nonwovens.

Embodiment 3

The water purification and storage system in the present embodiment is substantially same with that in the embodiment 1. The distinctions are listed as follows.

The water storage container in the present embodiment is tangentially connected by multiple triangular water-filtering well. Such water purification and storage system has a high stability, but a reduced water storage rate.

Embodiment 4

The water purification and storage system in the present embodiment is substantially same with that in the embodiment 1. The distinctions are listed as follows.

The water storage container in the present embodiment is tangentially connected by multiple regular octagonal water-filtering well. Such water purification and storage system is of high stability and high water storage rate. But the construction cost increases and the space occupied is larger.

For those skilled in this art, depending on the water storage capacity and water yield as well as the cycling speed, the water storage system may further dispose multiple water input wells and multiple water output wells. In addition, the polygon water-filtering well is not limited to triangle, hexagon and octagon, it may also be pentagon, heptagon etc. The water storage containers enclosed by the well walls of water-filtering well tangentially connected are all fallen within the protective scope of the present application.

In other embodiments, the building block 12 includes permeable substrate and two layers of permeable surface layer. The permeable surface layer and the permeable substrate are tightly integrated together, wherein the two layers of permeable surface layer form the inner wall and the outer wall of the water-filtering well respectively and the permeable substrate is located between the permeable surface layers. Particles of aggregates and the adhesives wrapping the particles of aggregates are respectively included in the permeable surface layer and the permeable substrate. The adhesives in the permeable surface layer at least include hydrophilic adhesive. The grain diameter of the particles of aggregates of the permeable surface layer is 0.2-0.425 mm and the grain diameter of the particles of aggregates of the permeable substrate is 1-10 mm.

When screening, it is unable and unnecessary to unify the particles of aggregates in the present application to the same particle size. Therefore, it is feasible within the above mentioned particle size range, for example, the grain diameter of the particles of aggregates of the permeable surface layer can be 0.25 mm, 0.3 mm, 0.35 mm etc. The grain diameter of the particles of aggregates of the permeable substrate may be 2 mm, 4 mm, 6 mm, 10 mm etc. The grain diameters of the particles of aggregates of the breathable impermeable grit being 0.075 mm, 0.09 mm, 0.1 mm, 0.3 mm, 0.425 mm are all fallen within the protective scope of the present application.

Apparently, the above embodiments are only for the purpose of illustration, not limitation. For those skilled in this art, various forms of changes or modifications can be made on the basis of the above description. It is not necessary to exhaustively illustrate all embodiments, and obvious changes or modifications obtained therefrom are still fallen with the protective scope of the present invention.

The invention claimed is:

1. A water purification and storage system comprising:
    a water storage container formed by:
        a plurality of tangentially connected water-filtering wells (1) having well walls made of a water-permeable structure, and
        an anti-leakage layer (4) arranged on the well bottom,
        at least one of the water-filtering wells (1) is a water output well (14);
        the well walls of the water-filtering wells (1) include a multilayer of spliced hexagonal subunits (11); each hexagonal subunit (11) is orthohexagonal and includes six spliced building blocks (12) of the same size and the seams of the building blocks (12) of adjacent layers are misaligned; an inner catching groove (121) is provided at one side of a long edge of the building block (12) and adapted for insertion of a side wall of adjacent building blocks (12), the side wall of one said building block (12) is adhesively connected to the inner catching groove (121) of a next building block (12), and the long edge of the building block (12) forms an inner wall enclosing the water-filtering well (1), and a short edge and side wall of the building block (12) forms an outer wall enclosing the water-filtering well (1);

a covering plate (2) arranged at an upper portion of the water storage container, said covering plate (2) comprising an impermeable covering plate (21) arranged at the upper portion of a water output well (14) and water-permeable covering plates (22) arranged at upper portions of other water-filtering wells; and a diaphragm wall (3) arranged around the water storage container.

2. The water purification and storage system according to claim 1, wherein a cavity (13) is arranged between an outer wall and an inner wall of the building block (12), within which a water purifying material is provided.

3. The water purification and storage system according to claim 2, wherein the building block (12) includes a permeable surface layer (5) and a permeable substrate (6); the permeable surface layer (5) and the permeable substrate (6) are tightly integrated together, wherein the permeable surface layer (5) forms the inner well wall of the water-filtering well and the permeable substrate (6) forms the outer well wall of the water-filtering well; particles of aggregates and adhesives wrapping the particles of aggregates are respectively included in the permeable surface layer (5) and the permeable substrate (6); the adhesives in the permeable surface layer (5) include at least hydrophilic adhesive; the grain diameter of the particles of aggregates of the permeable surface layer (5) is 0.2-0.425 mm and the grain diameter of the particles of aggregates of the permeable substrate (6) is 1-10 mm.

4. The water purification and storage system according to claim 2, wherein the water-permeable covering plates (22) are formed by applying multiple hexagonal water-permeable covering plates including particles of aggregates and hydrophilic adhesive wrapping the particles of aggregates; and a grain diameter of the particles of aggregates is 0.2-0.425 mm.

5. The water purification and storage system according to claim 2, wherein the impermeable covering plate (21) includes particles of silica sand and hydrophobic adhesives wrapping the particles of silica sand; air voids that a gas molecule can pass through but that liquid water molecules cannot penetrate are formed between adjacent particles of silica sand; and a grain diameter of the silica sand is 0.2-0.425 mm.

6. The water purification and storage system according to claim 2, wherein the diaphragm wall (3) is formed by a layer of breathable impermeable grit with a thickness of 5 cm-10 cm sandwiched by two layers of nonwovens; the breathable impermeable grit comprises particles of aggregates and hydrophobic resin membrane wrapping particles of aggregates; and a grain diameter of the particles of aggregate is 0.075-0.425 mm.

7. The water purification and storage system according to claim 2, wherein the anti-leakage layer (4) includes, in turn, from bottom to top a bearing layer (41) applied by a permeable concrete and a breathable layer (42) applied by breathable impermeable grit including particles of aggregates and a hydrophobic resin membrane wrapping particles of aggregates; and a grain diameter of the particles of aggregates is 0.075-0.425 mm.

8. The water purification and storage system according to claim 2, wherein at least one of the water-filtering well in the water storage container is a water input well (15) connected with sewage to be treated; the water input well (15) is separated from the water output well (14) by a distance of at least one water-filtering well; and the water output well is connected to a water suction pump.

9. The water purification and storage system according to claim 1, wherein the building block (12) includes a permeable surface layer (5) and a permeable substrate (6); the permeable surface layer (5) and the permeable substrate (6) are tightly integrated together, wherein the permeable surface layer (5) forms the inner well wall of the water-filtering well and the permeable substrate (6) forms the outer well wall of the water-filtering well; particles of aggregates and adhesives wrapping the particles of aggregates are respectively included in the permeable surface layer (5) and the permeable substrate (6); the adhesives in the permeable surface layer (5) include at least hydrophilic adhesive; the grain diameter of the particles of aggregates of the permeable surface layer (5) is 0.2-0.425 mm and the grain diameter of the particles of aggregates of the permeable substrate (6) is 1-10 mm.

10. The water purification and storage system according to claim 9, wherein the water-permeable covering plates (22) are formed by applying multiple hexagonal water-permeable covering plates including particles of aggregates and hydrophilic adhesive wrapping the particles of aggregates; and a grain diameter of the particles of aggregates is 0.2-0.425 mm.

11. The water purification and storage system according to claim 10, wherein the impermeable covering plate (21) includes particles of silica sand and hydrophobic adhesives wrapping the particles of silica sand; air voids that a gas molecule can pass through but that liquid water molecules cannot penetrate are formed between adjacent particles of silica sand; and a grain diameter of the silica sand is 0.2-0.425 mm.

12. The water purification and storage system according to claim 11, wherein the diaphragm wall (3) is formed by a layer of breathable impermeable grit with a thickness of 5 cm-10 cm sandwiched by two layers of nonwovens; the breathable impermeable grit comprises particles of aggregates and hydrophobic resin membrane wrapping particles of aggregates; and a grain diameter of the particles of aggregate is 0.075-0.425 mm.

13. The water purification and storage system according to claim 12, wherein the anti-leakage layer (4) includes, in turn, from bottom to top a bearing layer (41) applied by a permeable concrete and a breathable layer (42) applied by breathable impermeable grit including particles of aggregates and a hydrophobic resin membrane wrapping particles of aggregates; and a grain diameter of the particles of aggregates is 0.075-0.425 mm.

14. The water purification and storage system according to claim 13, wherein at least one of the water-filtering well in the water storage container is a water input well (15) connected with sewage to be treated; the water input well (15) is separated from the water output well (14) by a distance of at least one water-filtering well; and the water output well is connected to a water suction pump.

15. The water purification and storage system according to claim 1, wherein the water-permeable covering plates (22) are formed by applying multiple hexagonal water-permeable covering plates including particles of aggregates and hydrophilic adhesive wrapping the particles of aggregates; and a grain diameter of the particles of aggregates is 0.2-0.425 mm.

16. The water purification and storage system according to claim 1, wherein the impermeable covering plate (21) includes particles of silica sand and hydrophobic adhesives wrapping the particles of silica sand; air voids that a gas molecule can pass through but that liquid water molecules cannot penetrate are formed between adjacent particles of silica sand; and a grain diameter of the silica sand is 0.2-0.425 mm.

17. The water purification and storage system according to claim 1, wherein the diaphragm wall (3) is formed by a layer of breathable impermeable grit with a thickness of 5 cm-10 cm sandwiched by two layers of nonwovens; the breathable impermeable grit comprises particles of aggregates and hydrophobic resin membrane wrapping particles of aggregates; and a grain diameter of the particles of aggregate is 0.075-0.425 mm.

18. The water purification and storage system according to claim 1, wherein the anti-leakage layer (4) includes, in turn, from bottom to top a bearing layer (41) applied by a permeable concrete and a breathable layer (42) applied by breathable impermeable grit including particles of aggregates and a hydrophobic resin membrane wrapping particles of aggregates; and a grain diameter of the particles of aggregates is 0.075-0.425 mm.

19. The water purification and storage system according to claim 1, wherein at least one of the water-filtering well in the water storage container is a water input well (15) connected with sewage to be treated; the water input well (15) is separated from the water output well (14) by a distance of at least one water-filtering well; and the water output well is connected to a water suction pump.

\* \* \* \* \*